United States Patent [19]
McConaghy

[11] Patent Number: 5,515,957
[45] Date of Patent: May 14, 1996

[54] UNI-DIRECTIONAL TRANSMISSION WITH POSITIVE ENGAGEMENT AND DISENGAGEMENT FEATURES

[76] Inventor: Robert F. McConaghy, 12121 NE. 66th St., Kirkland, Wash. 98033

[21] Appl. No.: 303,237

[22] Filed: Sep. 8, 1994

[51] Int. Cl.⁶ .................................................. F16D 41/24
[52] U.S. Cl. .......................................... 192/64; 301/110.5
[58] Field of Search ..................... 192/64, 67 A, 192/48.92, 93 A; 301/110.5

[56] References Cited

U.S. PATENT DOCUMENTS

| | | | |
|---|---|---|---|
| 3,010,553 | 11/1961 | Van Der Plas | 192/64 |
| 3,166,171 | 1/1965 | Schwerdhöfer et al. | 192/64 |
| 3,182,529 | 5/1965 | Schwerdhöfer | 192/64 X |
| 4,593,799 | 6/1986 | Ozaki | 192/64 X |
| 4,711,331 | 12/1987 | Hoffmann | 192/46 |
| 4,840,084 | 6/1989 | Durham | 74/594.1 |
| 4,840,260 | 6/1989 | Josereau | 192/64 |
| 4,913,500 | 4/1990 | Wauke et al. | 192/48.92 X |
| 5,125,489 | 6/1992 | Cha | 192/6 |
| 5,163,740 | 11/1992 | Kawai et al. | 192/48.92 X |
| 5,188,205 | 2/1993 | Karp et al. | 192/46 |
| 5,322,487 | 6/1994 | Nagano | 192/64 X |

*Primary Examiner*—Andrea L. Pitts
*Attorney, Agent, or Firm*—Dean A. Craine

[57] ABSTRACT

Disclosed herein is a uni-directional transmission with positive engagement and automatic disengagement features. The transmission includes a rotatable drive shaft coaxially aligned and housed inside a rotatable hub. Attached to the drive shaft is a uni-directional friction clutch which automatically engages when the drive shaft is rotated in a forward direction. When the friction clutch is engaged, a spline disc located on the drive shaft is forced axially on the drive shaft causing the axially aligned teeth formed on one surface of the spline disc to positively engage the complimentary-shaped, axially aligned teeth formed on the ratchet surface on the hub. When the teeth on the ratchet surfaces are engaged, torque from the drive shaft will be transferred to the hub. A coil spring is disposed on the drive shaft between the spline disc and the hub which acts to automatically disengage the ratchet teeth on the spline disc and the hub when rotation of the drive shaft is stopped or reversed.

5 Claims, 4 Drawing Sheets

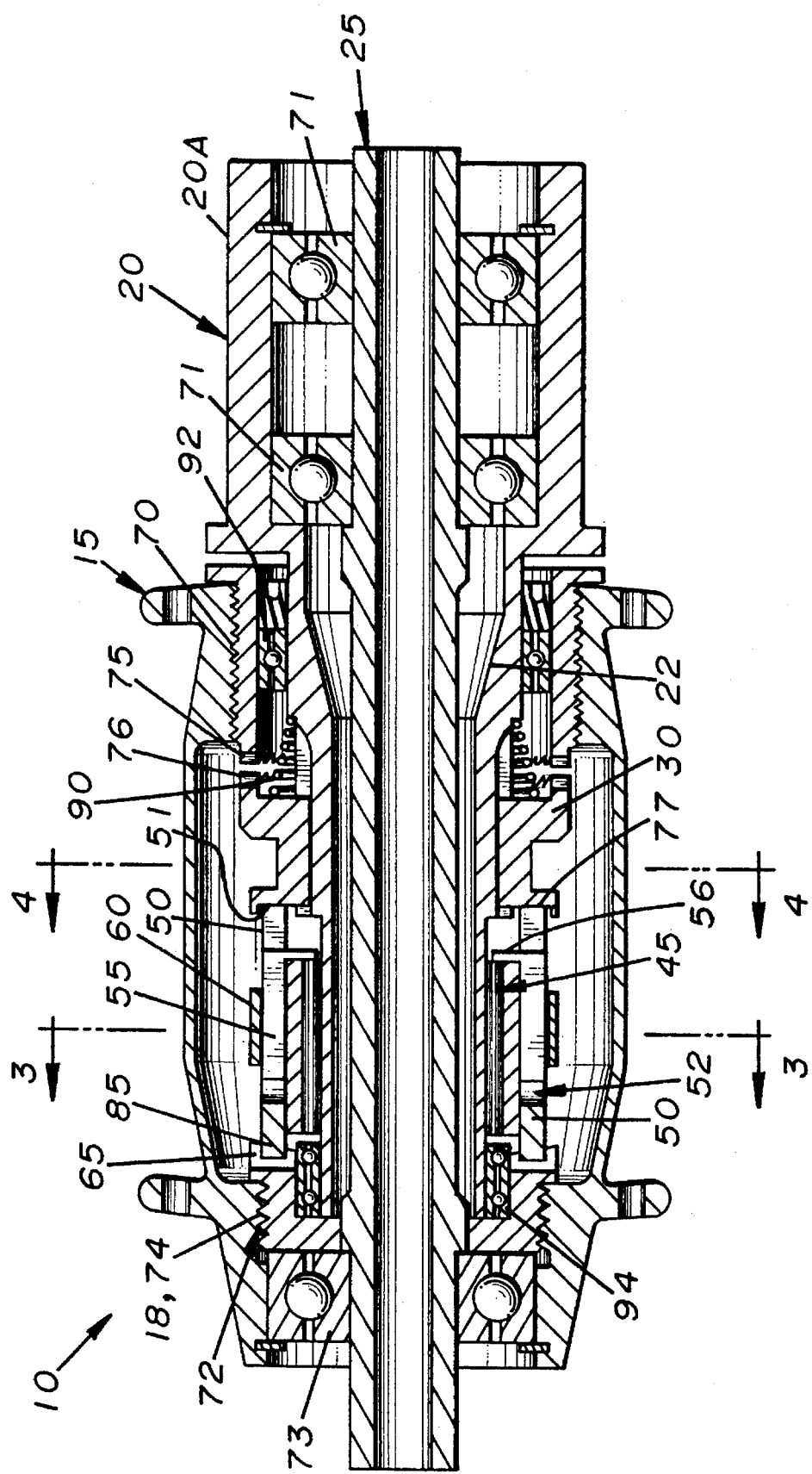

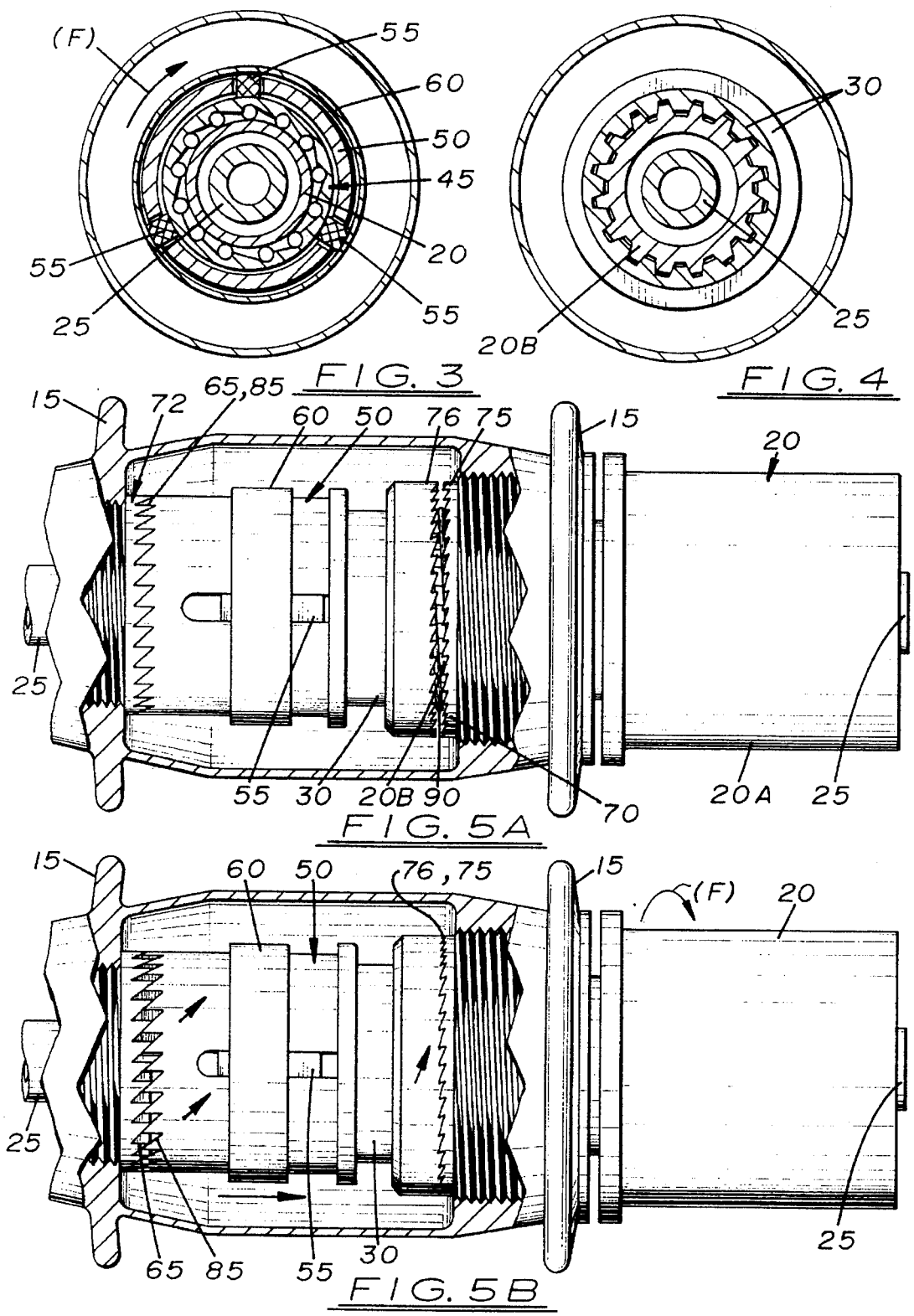

UNI-DIRECTIONAL TRANSMISSION WITH POSITIVE ENGAGEMENT AND DISENGAGEMENT FEATURES

BACKGROUND OF THE INVENTION

1. Field of the Invention

This invention relates to transmissions and, more particularly, to transmissions which positively engage in one direction and are freewheeling in the opposite direction.

2. Description of the Related Art

Conventional bicycle transmissions allow power to be transmitted to the rear wheel while pedaling and freewheeling when pedaling stops. Typically, such transmissions, called freewheeling transmissions, use a ratchet wheel and a plurality of pawl components aligned radially. The pawls are pivotally mounted on a coaxially-mounted member which act against the teeth on a ratchet wheel. When pedaling, the outer tip of the pawls engage the teeth on the ratchet wheel to force the ratchet wheel in one direction. When pedaling is stopped or reversed, the tips of the pawls disengage the teeth of the ratchet wheel thereby enabling the transmission to freewheel. When freewheeling, the tips of the pawls move over the teeth on the ratchet wheel as it continues to rotate, creating the familiar "clicking" sound of a coasting bicycle. Although the "clicking" sound can be annoying to some users, ratchet and pawl type transmissions are compact, cheap, lightweight and can transmit considerable torque for their size and weight.

With the growing popularity of mountain riding and on and off-road racing, the demand for higher performance transmissions with greater torque capacity has increased. Unfortunately, traditional ratchet and pawl type transmissions are unable to meet this demand. Although the easiest and best means to increase the torque capacity of the ratchet and pawl type transmissions would be to increase the diameter of the rear hub or the number of pawls, world-wide adopted standards governing rear hub sizes and the exchangability of rear wheel sprocket sets preclude such change. Also, by increasing the number of pawls, friction is increased in the freewheel direction.

Another important drawback with ratchet and pawl type transmissions is that they require proper lubrication and cleaning. This is especially true for downhill racing and off-road riding. To overcome this problem, most ratchet and pawl type transmissions use labyrinth or very lightly loaded lip seals to prevent contamination which have proven to be only marginally effective.

Another drawback with ratchet and pawl type transmissions is the noise created while coasting. Such noise can be a tactical liability when racing.

Recently, a modified ratchet and pawl type transmission has been developed by Union Sils of Germany which addresses some of the problems associated with typical ratchet and pawl type transmissions. In the modified ratchet and pawl type transmission, two axially aligned, toothed discs face each other, one fixed to a driver and a other splined to the driven member. A spring behind the axially free disc lightly loads it against the driven disc. In the torque-carrying direction, the discs are forced together which enables their opposing sets of teeth to engage and transmit torque. In reverse rotation, the shape of the teeth forces the moveable disc to separate from the fixed disc to disengage therefrom. As rotation continues, the spring forces the moveable disc towards the fixed disc thereby producing an audible "clicking" sound. Unfortunately, substantial drag is produced when in the freewheel direction. Also, failure is possible due to the high speed oscillary motion of the driven disc while freewheeling. This disc has many times the mass of the traditional pawls and, in combination with a weak return spring, has a low resonant frequency. This could damage parts or cause power robbing resonant modes of behavior within the speed range of a bicycle.

Another type of transmission used for bicycles is known as a uni-directional friction clutch as disclosed by the manufacturers, Winner and Torrington. Such transmissions exhibit low drag and quiet operation in the freewheel direction, and engage quickly in the torque-carrying direction. Their principle weakness, however, is a lack of torque carrying ability, without incurring unacceptable penalties in size and weight.

SUMMARY OF THE INVENTION

It is an object of the invention to provide a uni-directional transmission with positive engagement and disengagement features.

It is another object of the invention to provide such a transmission adaptable for a bicycle.

It is another object of the present invention to provide such a transmission that is compact, lightweight, and interchangable with conventional rear hub assemblies on bicycles.

It is still another object of the present invention to provide such a transmission which is quiet and exhibits reduced friction while freewheeling.

These and other objects of the invention are met by providing a uni-directional transmission with a positive drive and an automatic disengagement feature with reduced friction and noise free wheeling. The transmission includes a rotatable driven member and a coaxially aligned driving member. Attached to the driving member is a uni-directional friction clutch which the driving member automatically engages when the driving member is rotated in a forward direction. When the uni-directional friction clutch is engaged by the driving member, a coupling means is used to move a spline disc axially over the driving member to engage the driven member as the uni-directional clutch begins to rotate. In the preferred embodiment, the coupling means includes an outer sleeve which surrounds the friction clutch. As the outer sleeve rotates, the follower teeth manufactured on one end of the outer sleeve moves over a plurality of axially aligned cam profiles formed on the inside surface of the driven member. The engagement of the follower teeth and the cam profiles moves the outer sleeve axially over the drive shaft which, in turn, forces the adjacent spline disc located on the driving member axially thereon. When the spline disc is forced axially over the driving member, teeth located on the ratchet surface on the opposite end of the spline disc engage the teeth located on the ratchet surface on the driven member. By engaging the teeth on the opposing ratchet surfaces in this manner, the driving member and the driven member may be interconnected. When rotation of the driving member is stopped or reversed, a spring means disposed between the end of the spline disc and the driven member forces the spline disc and driven member apart thereby causing disengagement of the driving member from the driven member.

By using a uni-directional friction clutch to positively engage the teeth of the ratchet surface on the spline disc with the teeth on the ratchet surface on the driven member, and which automatically disengages when rotation of the driving member is stopped or reversed, the transmission operates with less friction and noise than typical ratchet and pawl type transmissions found in the prior art. In one embodiment, the transmission is designed to be use on a bicycle with the driven member comprising the rear hub of a bicycle and the driving member comprising the drive shaft disposed therein.

BRIEF DESCRIPTION OF THE DRAWINGS

FIG. 2 is a sectional view of the invention taken along line 2—2 in FIG. 1.

FIG. 3 is a sectional view of the invention taken along line 3—3 in FIG. 2.

FIG. 4 is a sectional view of the invention taken along line 4—4 in FIG. 2.

FIG. 5a is a side elevational view of the invention showing the transmission in a freewheeling condition with the spline disc disengaged from the hub.

FIG. 5b is a side elevational view of the invention showing the transmission with the spline disc engaged with the hub.

DESCRIPTION OF THE PREFERRED EMBODIMENT(S)

Figure 1:
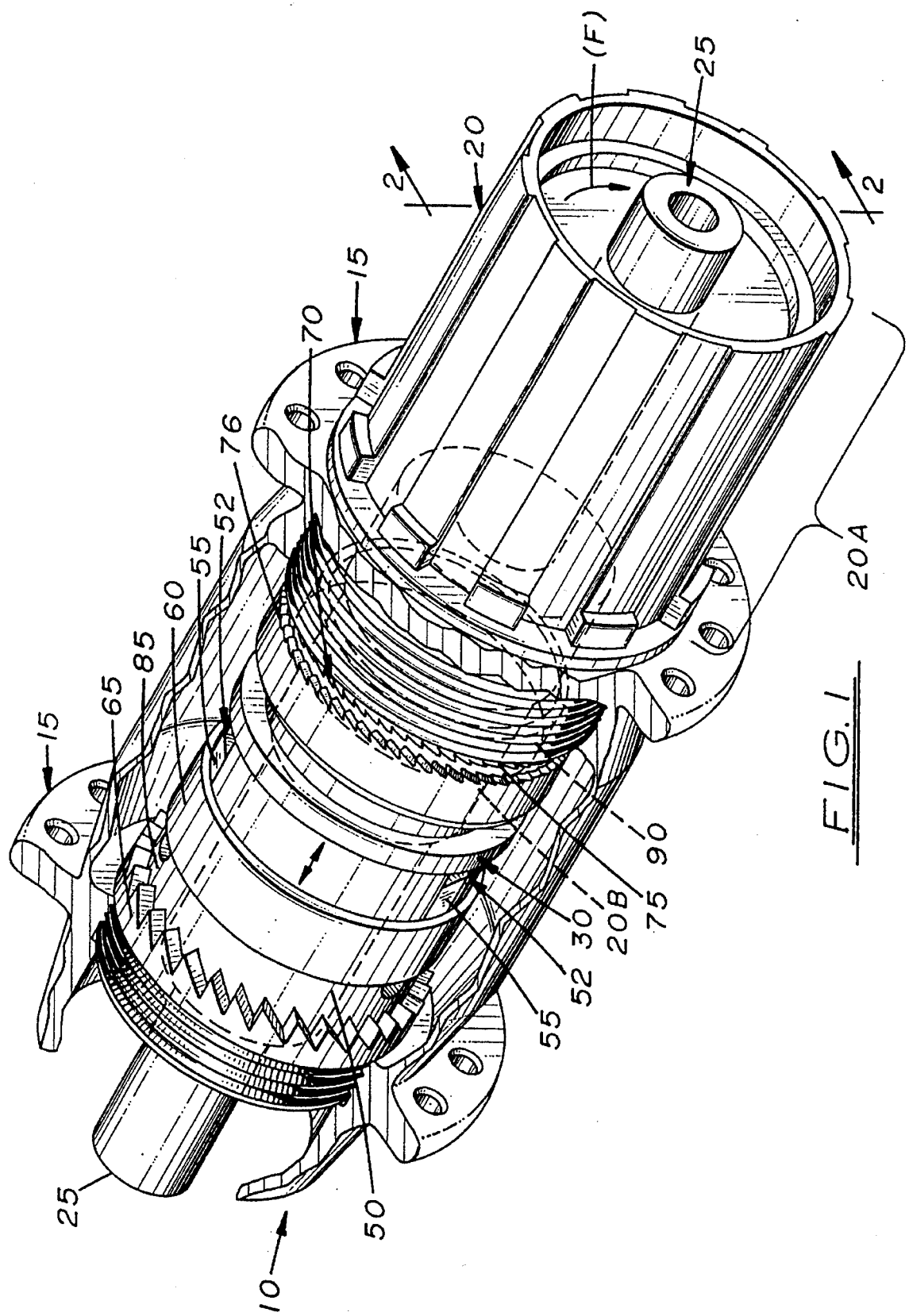
FIG. 1 is a perspective view of the invention disclosed herein.

Shown in the accompanying FIGS. 1–6(c), there is shown a uni-directional transmission, denoted as reference number 10 for a bicycle or similar object in which torque generated by one means, such as the front sprocket on a bicycle, is transferred to another means, such as the rear wheel hub of a bicycle. The transmission 10 comprises a rotatable driving member, referred to hereinafter as a drive shaft 20, which is coaxially mounted, inside an independent, rotatable driven member, referred to hereinafter as hub 15. Disposed on the drive shaft 20, is a uni-directional friction clutch 45, shown more clearly in FIGS. 2 and 3. When the drive shaft 20 rotates in a forward direction, denoted direction (f), it engages the friction clutch 45, causing the friction clutch 45 to rotate therewith. When the drive shaft 20 engages the friction clutch 45, a spline disc 50 disposed on the drive shaft 20 and adjacent to the friction clutch 45 is forced against the radially aligned, first ratchet surface 75 manufactured on the inside surface of the inner housing of the bearing cartridge 70 threadingly attached to the hub 15. As the spline disc 30 is rotated, it is forced axially over the drive shaft 20 towards the bearing cartridge 70. Manufactured on the spline disc 30 is a second ratchet surface 76 which positively engages the first ratchet surface 75 located on the bearing cartridge 70. Rotational movement of the drive shaft 20 can then be directly transferred to the hub 15.

Disposed around the drive shaft 20 between the spline disc 30 and the inside surface of the bearing cartridge 70 is a coil spring 90 which resiliently opposes the engagement of the first and second ratchet surfaces 75, 76, respectively. Therefore, when rotation of the drive shaft 20 is stopped or reversed, the spline disc 30 is automaticially forced axially over the drive shaft 15 by the coil spring 90 to its original position thereby disengaging the first and second ratchet surfaces 75, 76.

FIG. 2 shows the transmission 10 in greater detail. The drive shaft 20 is a hollow, elongated rod. Disposed inside the drive shaft 20 is a non-rotating center shaft 25 which is attached at its opposite ends to the rear drop-out on a bicycle (not shown). Near the first end of the drive shaft 20 is a splined, cylindrical-shaped structure 20(a) designed to receive a standard sprocket cluster (not shown). In the preferred embodiment, the cylindrical-shaped structure 20(a) is similar to a sprocket cassette, known in the bicycle art as a SHIMANO Cassette. A chain (not shown) is attached to one of the sprockets in the sprocket cluster which causes the drive shaft 20 to rotate when pedaling.

The hub 15 is similar to a standard rear wheel hub used on a bicycle with a large threaded opening at one end designed to receive a large, threaded bearing cartridge 70 and a smaller opening at the opposite end designed to receive an outer bearing 73. Disposed inside the cylindrical-shaped structure 20(a), are two inner bearings 71. Together the bearings 70–73 act together to hold the drive shaft 20 in place on the center shaft 25.

Manufactured on the hub 15 just inside the outer bearing 73, are internal threads 18 designed to receive the threads 74 of a second inner bearing cartridge 72 connected thereto. Formed on the inside surface of the inner bearing cartridge 72 is an axially aligned cam surface 65 having a plurality of identical cam profiles manufactured thereon. Formed on the inside surface of the large bearing cartridge 70 is an axially aligned, first ratchet surface 75. The surface of the drive shaft 20 adjacent to the large bearing cartridge 70 when the drive shaft 20 is placed into the hub 15 is smooth. First and second inner bearings 92, 94 are disposed between the bearing cartridge 70 and the drive shaft 20, thereby enabling the drive shaft 20 to rotate freely therein.

As shown in FIGS. 1 and 4, the surface 20(b) of the drive shaft 20 adjacent to the smooth surface is splined which, during assembly, interconnects with a spline disc 30 disposed over the drive shaft 20. The spline disc 30 has a central bore with a complimentary shaped, inner surface which enables it to be locked radially in position on the drive shaft 20 yet axially free to move over the drive shaft 20. Formed on the surface on the spline disc 30 facing the bearing cartridge 70 is an axially aligned, second ratchet surface 76. The surface 77 of the spline disc 30 opposite the second ratchet surface 76 is smooth.

Disposed over the drive shaft 20 between the spline disc 30 and the bearing cartridge 70 is a biasing means, such as a coil spring 90, which forces the spline disc 30 axially over the drive shaft 20 in the direction opposite to the bearing 70. Thus, in the absence of any other axially aligned force applied to the spline disc 30, the first and second ratchet surfaces 75, 76, respectively, are separated.

Mounted around the drive shaft 20 adjacent to the spline disc 30 is a uni-directional friction clutch 45. As mentioned above, the friction clutch 45 is designed to engage the drive shaft 20 when the drive shaft 20 is rotated in a forward direction. In the preferred embodiment, the friction clutch 45 is a spring loaded roller or ball-type friction clutch. In other embodiments, a sprag or wire wrap friction clutch may be used. In still other embodiments, the friction clutch may be replaced with a positive ratchet and pawl type clutch.

As shown in FIGS. 2 and 3, attached over the friction clutch 45, is a cylindrical-shaped sleeve 50 with two or more evenly spaced, axially aligned longitudinal slots 52 formed therein. One rectangular-shaped key 55 is oriented lengthwise inside each slot. Located around the outer surface of the sleeve 50 is a spring band 60 which holds the keys 55 forcibly against the outer surface of the friction clutch 45 without touching the sleeve 50. A tang 56 on one end of each key 55 extends radially inward and is trapped axially between one end of the friction clutch 45 and a shoulder 22 on the drive shaft 20, preventing axial movement of the key 55. The slots 52 are slightly larger than the keys 55 thereby enabling the sleeve 30 to move freely in the axial direction over the drive shaft 20, guided by the keys 55.

The end 51 of the sleeve 50 adjacent to the smooth end 77 of the spline disc 30 is also smooth thereby enabling the sleeve 50 and spline disc 30 to rotate independently with minimum friction. Manufactured on the opposite end of the sleeve 50 are a plurality of radially aligned follower teeth 85 which engage the cam profiles on the cam surface 65 located on the inner bearing cartridge 72 during operation.

When the drive shaft 20 is at rest or rotated in rearward direction, the teeth on the first and second ratchet surfaces 75, 76, respectively, are separated, as shown in FIG. 5(a), thereby enabling the transmission 10 to freewheel. When the drive shaft 20 is rotated in a forward direction, it instantly engages the friction clutch 45 which begins to rotate therewith. As the friction clutch 45 rotates, the keys 55 are forced to rotate causing the outer sleeve 50 to also rotate. As the outer sleeve 50 rotates, the follower teeth 85 move over the cam profiles on the cam surface 65 which forces the sleeve 50 axially over the drive shaft 20. Since the slots 52 in the sleeve 50 are longer than the keys 55, movement of the sleeve 50 over the drive shaft 20 is allowed without axially displacing the keys 55. As the sleeve 50 is moved axially over the drive shaft 20, the splined disc 30 is forced axially towards the bearing cartridge 70 attached to the hub 15 as shown in FIG. 5(b). As the spline disc 30 approaches the bearing cartridge 70, the first and second ratchet surfaces 75, 76, respectively, engage to interconnect the drive shaft 20 with the hub 15.

The first and second ratchet surfaces 75, 76, respectively, must be compatible in shape in order to be positively engaged. Also, the shape and size of the follower teeth 85 and the cam surface 65 must be sufficient so that the spline disc 30 moves axially over the drive shaft 20 a sufficient distance to properly mesh the first and second ratchet surfaces 75, 76, respectively.

Figure 6A:
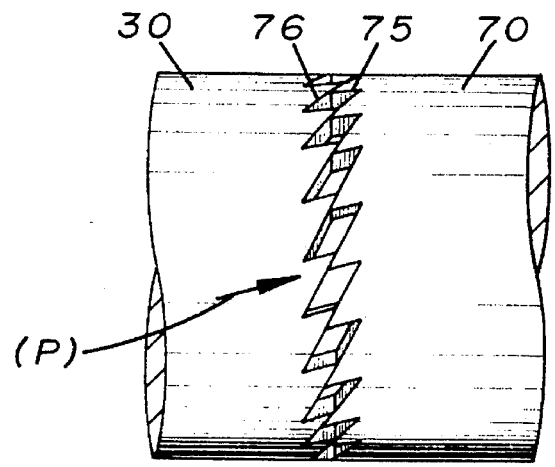
FIG. 6a is a side elevational view of the ratchet teeth on the spline disc and the hub shown making initial contact.
Figure 6B:
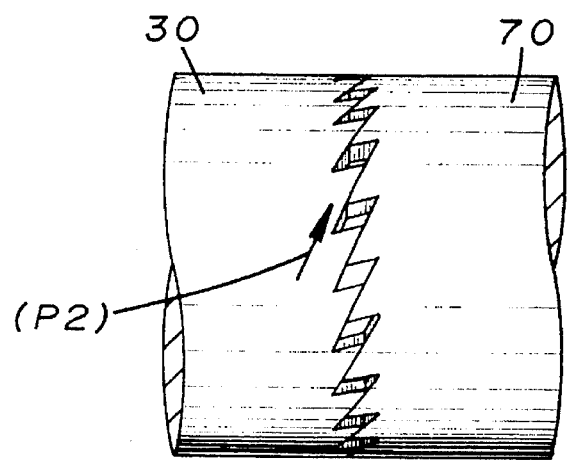
FIG. 6b is a side elevational view similar to FIG. 6a showing the ratchet teeth on the spline disc and the hub sliding into engagement.
Figure 6C:
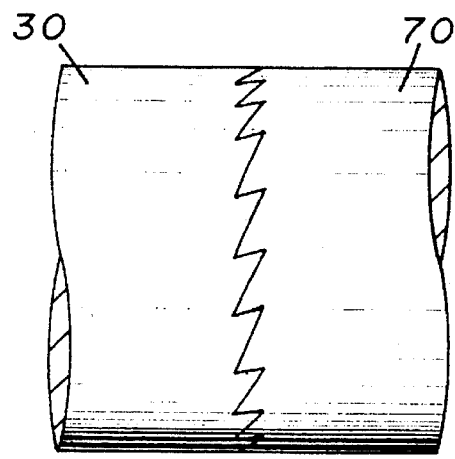
FIG. 6c is a side elevational view similar to FIGS. 6a and 6b showing the spline disc further rotated so that the ratchet teeth on the spline disc and the hub are fully engaged.

FIGS. 6(a)–(c) illustrate the movement of the spline disc 30 over the drive shaft 25 and towards the bearing cartridge 70. More particularly, FIG. 6(a) shows the teeth of the second ratchet surface 76 making initial contact with the teeth of the first ratchet surface 75. FIG. 6(b) shows the helical path of the spline disc 30 when it is partially engaged with the bearing cartridge 70. In FIG. 6(c), the first and second ratchet surfaces 75, 76, respectively, are fully engaged. The relative motion of the spline disc 30 follows a helical path, denoted (P), because the drive shaft 20 is rotating relative to the hub 15. The angle of this helical path is determined by the shape of the cam surfaces 65 and the follower teeth 85. If, by design, the helical path dictated by the cam surface 85 and the following teeth 85 and the path that the splined disc 30 would like to follow as it slides into complete mesh with the first ratchet teeth 75 located on the bearing cartridge 70 differ, slippage must be allowed to occur somewhere in the mechanism. This is one of the two reasons why the keys 55 are spring loaded on the friction clutch 45 and not fixed solidly to its outer surface. The keys 55 can slip on the outer surface of the friction clutch 45 to accommodate the exact path the first and second ratchet surfaces 75, 76 respectively would like to follow as they engage. The other reason is to limit the amount of torque the friction clutch 45 is called upon to transmit, so not to damage it. When fully engaged, the flow of transmitted torque is from the drive shaft 20, to the splined disc 30, through its teeth on the second ratchet surface 76 into the mating teeth on the first ratchet surface 75 to the inside end of the hub 15. The assembly will then rotate as a fixed mass about the center shaft 25 for as long as torque is applied.

When rotation is reversed into the torque-carrying direction after freewheeling, there is some angle through which the drive shaft 20 will turn before the first and second ratchet surfaces 75, 76, respectively, are fully engaged. This angle is a function of the quickness with which the friction clutch 45 engages, the shape of the teeth and cam surfaces 65, 85, respectively, the width of the clearance gap between the first and second ratchet surfaces 75, 76, respectively, and the depth and number of the teeth on these surfaces 75, 76. In the bicycle application, it is probably sufficient to limit this angle to 20 degrees of drive shaft 20 rotation, which is common to traditional ratchet and pawl mechanisms. This is easily achieved, but could be reduced considerably if desired.

When the rotational speed of the drive shaft 20 begins to slow relative to the hub 15, the frictional clutch 45 is now freewheeling, and the keys 55 apply no rotational torque to the sleeve 50. Acting under the axial force of the coil spring 90 and the tendency of the teeth on the first and second ratchet surfaces 75, 76 to force themselves apart under reverse rotation, it and the splined disc 30 move axially towards the inner bearing cartridge 72, re-engaging the cam surfaces 65, 85. At this point, there is rotational movement between the sleeve 50 and the splined disc 30, which might add unnecessary friction to motion in the freewheel direction. This can be minimized or eliminated by putting an axial roller bearing between these surface, installing a retaining ring on the drive shaft 20 to stop the axial motion of the spline disc 30 beyond some point, or by limiting the active range of the coil spring 90.

The final result is that, when in the freewheeling direction, the teeth on the first and second ratchet surfaces 75, 76 are completely disengaged and the friction clutch 45 is freewheeling. When the sense of the relative rotation reverses, the friction clutch 45 engages, rotating the sleeve's follower teeth 85 against that of the cam surface 65, which causes the axial movement of the sleeve 50 and splined disc 30 so as to engage the first and second ratchet surfaces 75, 76, respectively.

In compliance with the statute, the invention, described herein, has been described in language more or less specific as to structural features. It should be understood, however, the invention is not limited to bicycle technology or the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

I claim:

1. A uni-directional transmission, comprising:

a) a rotatable driven member;

b) a rotatable driving member coaxially aligned with said driven member;

c) a uni-directional clutch disposed on said driving member engaged by said driving member when said driving member is rotated in a forward direction and disengaged from said driving member when rotation of said driving member is either stopped or reversed;

d) a spline disc axially aligned on said driving member, said spline disc being axially moved on said driving member when said driving member engages said uni-directional clutch, said spline disc being engaging said driven member when axially moved on said driving member to interconnect said driving member with said driven member;

e) a coupling means for moving said spline disc axially over said driving member to engage said driven member when said driving member engages said uni-directional clutch, and;

f) a biasing means disposed between driven member and said spline disc for moving said spline disc axially over said driving member to disengage said spline disc from said driven member when rotation of said driving member is stopped or reversed.

2. An apparatus, as recited in claim 1, wherein said uni-directional clutch is a friction clutch.

3. An apparatus, as recited in claim 2, wherein said driving member is a drive shaft.

4. An apparatus, as recited in claim 3, wherein said driven member is a rear bicycle hub.

5. An apparatus, as recited in claim 2, wherein said coupling means is a slidably mounted outer sleeve disposed over said uni-directional clutch, said coupling means further including an axially aligned cam surface formed on said driven member meshing with and driving a plurality of follower teeth formed on said outer sleeve to axially move said outer sleeve against said spline disc to interconnect said spline disc with said driven member.

\* \* \* \* \*